US012761523B2

(12) United States Patent

Saleeb-Mousa et al.

(10) Patent No.: US 12,761,523 B2

(45) Date of Patent: Oct. 13, 2026

(54) INTEGRATED VARIABLE OPTICAL ATTENUATOR

(71) Applicant: Lumentum Technology (UK) Limited, Northamptonshire (GB)

(72) Inventors: Bruce Saleeb-Mousa, Banbury (GB); Daniel Jorge Pires Jalo, Northampton (GB); Hatem Elrefaei, Ottawa (CA); Ron Moore, Ottawa (CA)

(73) Assignee: Lumentum Technology UK Limited, Northamptonshire (GB)

( * ) Notice: Subject to any disclaimer, the term of this patent is extended or adjusted under 35 U.S.C. 154(b) by 319 days.

(21) Appl. No.: 18/435,648

(22) Filed: Feb. 7, 2024

(65) Prior Publication Data

US 2025/0189860 A1 Jun. 12, 2025

Related U.S. Application Data

(60) Provisional application No. 63/607,962, filed on Dec. 8, 2023.

(51) Int. Cl.

| | |
|---|---|
| ***G02B 6/26*** | (2006.01) |
| ***G02B 6/28*** | (2006.01) |
| ***G02B 6/293*** | (2006.01) |
| ***G02F 1/01*** | (2006.01) |
| ***G02F 1/025*** | (2006.01) |
| ***G02F 1/21*** | (2006.01) |
| *G02B 6/12* | (2006.01) |

(52) U.S. Cl.

CPC ............. *G02F 1/217* (2021.01); *G02B 6/266* (2013.01); *G02B 6/2813* (2013.01); *G02B 6/29346* (2013.01); *G02F 1/0113* (2021.01); *G02F 1/025* (2013.01); *G02B 6/12* (2013.01); *G02B 2006/1209* (2013.01); *G02B 2006/12159* (2013.01); *G02F 2203/48* (2013.01)

(58) Field of Classification Search

CPC ........ G02B 6/12; G02B 6/266; G02B 6/2813; G02B 6/29346; G02B 2006/1209; G02B 2006/12159; G02F 1/0113; G02F 1/025; G02F 1/217; G02F 2203/48

See application file for complete search history.

(56) References Cited

U.S. PATENT DOCUMENTS

| | | | | |
|---|---|---|---|---|
| 7,155,088 | B2 * | 12/2006 | Thapliya | G02F 1/225 385/132 |
| 9,874,709 | B2 * | 1/2018 | Hayakawa | G02B 6/2726 |
| 10,067,363 | B2 * | 9/2018 | Tu | G02F 1/095 |

(Continued)

FOREIGN PATENT DOCUMENTS

| | | | | |
|---|---|---|---|---|
| CN | 112034636 A | * 12/2020 | | G02F 1/011 |
| CN | 115291322 A | * 11/2022 | | G02B 6/1221 |

(Continued)

*Primary Examiner* — Ryan A Lepisto

(74) *Attorney, Agent, or Firm* — Harrity & Harrity, LLP

(57) ABSTRACT

In some implementations, an electro-optical device includes a multi-mode interferometer (MMI) variable optical attenuator (VOA), comprising: an input to receive an optical beam; an output to output the optical beam; and an optical waveguide to couple the input to the output, wherein the optical waveguide is configured to self-image the optical beam within the optical waveguide; and a control component to apply a forward voltage across the MMI VOA to control attenuation of the MMI VOA.

20 Claims, 9 Drawing Sheets

200

(56) References Cited

U.S. PATENT DOCUMENTS

| | | | | |
|---|---|---|---|---|
| 2003/0091287 | A1 * | 5/2003 | Lam | G02F 1/3138 385/140 |
| 2006/0210232 | A1 * | 9/2006 | Wu | G02F 1/225 385/140 |

FOREIGN PATENT DOCUMENTS

| | | | | | |
|---|---|---|---|---|---|
| KR | 20030021844 | A * | 3/2003 | | |
| WO | WO-2012097982 | A1 * | 7/2017 | | G02B 6/2813 |

* cited by examiner

200

200

400

410

INTEGRATED VARIABLE OPTICAL ATTENUATOR

CROSS-REFERENCE TO RELATED APPLICATION

This patent application claims priority to U.S. Provisional Patent Application No. 63/607,962, filed on Dec. 8, 2023, and entitled "INTEGRATED VARIABLE OPTICAL ATTENUATOR." The disclosure of the prior application is considered part of and is incorporated by reference into this patent application.

TECHNICAL FIELD

The present disclosure relates generally to optical devices and to an integrated variable optical attenuator using current injection on a multimode interferometer.

BACKGROUND

An optical attenuator is an electro-optical device that can be used to reduce a power level of an optical signal in an optical system. For example, an optical attenuator may be provided in an optical signal for equalizing powers in different channels, preventing saturation of photodetectors, or equalizing gains from different amplification sources, among other examples. An optical attenuator may be polarization independent and wavelength independent across a configured operational wavelength range and a configured operational temperature range to avoid introducing incorrect levels of attenuation or altering another characteristic, such as a polarization state or wavelength, of an optical beam.

SUMMARY

In some implementations, a variable optical attenuator (VOA) includes a multi-mode interferometer (MMI), comprising: an optical waveguide, wherein a set of parameters of the optical waveguide is configured to cause a set of modes of an optical beam to interfere and self-image the optical beam; and a control component to apply a forward voltage across the VOA to control attenuation of the VOA, and wherein a change in a part of the refractive index of the optical waveguide is associated with carrier injection associated with the forward voltage.

In some implementations, an electro-optical device includes at least one MMI VOA, an MMI VOA, of the at least one MMI VOA, comprising: an input to receive an optical beam; an output to output the optical beam; and a multimode optical waveguide in between to couple the input to the output, a control component to apply a forward voltage across the MMI VOA to control attenuation of the MMI VOA, In some implementations, an electro-optical device includes an MMI VOA, comprising: an input to receive an optical beam; an output to output the optical beam; and a multimode optical waveguide to couple the input to the output, wherein the optical waveguide is configured to self-imaging the optical beam within the optical waveguide; and a control component to apply a forward voltage across the MMI VOA to control attenuation of the MMI VOA.

DETAILED DESCRIPTION

Figure 1A:
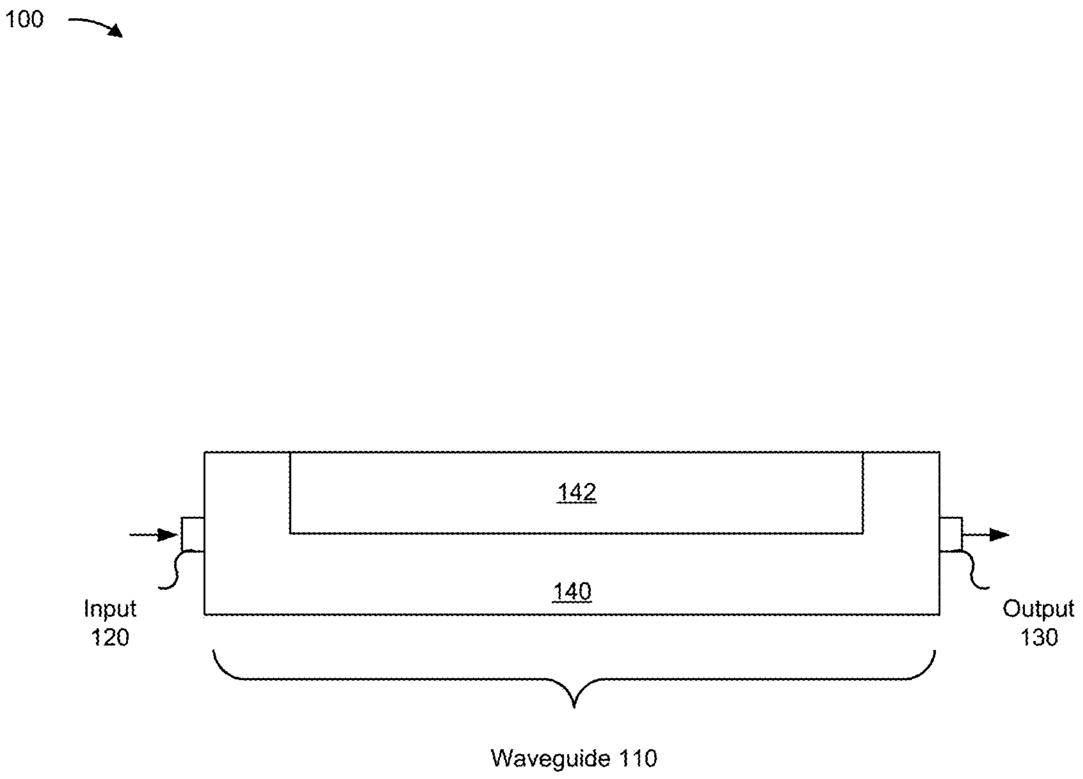
FIGS. 1A-1C are diagrams of an example electro-optical device associated with an integrated variable optical attenuator (VOA).

The following detailed description of example implementations refers to the accompanying drawings. The same reference numbers in different drawings may identify the same or similar elements.

Optical systems, such as optical communications systems, optical measurement systems, or optical testing systems, among other examples, may include an optical attenuator to apply attenuation to an optical beam. For example, an optical communications system may include an electro-optical device to apply attenuation to an optical beam for equalizing optical powers between different channels, avoiding saturation of a photodetector, or equalizing gains from different amplification sources, among other examples.

Variable optical attenuators (VOAs) may be used to apply different levels of attenuation to an optical beam at different times. For example, a Mach-Zehnder (MZ) interferometer (MZI) may be used for an MZ-VOA. For an integrated MZ-VOA, an optical beam is coupled into a chip (e.g., an indium phosphide (InP) receiver chip) and split into two arms of the MZI using a Y-branch splitter or a 1×2 multimode interferometer (MMI). As the split optical beam is passed through sections of the respective arms of the MZI, a phase shift is applied and, when the split optical beam is recombined, destructive interference between the two arms results in attenuation of the optical beam. In this example, the phase shift can be controlled in one arm of the MZI (e.g., in a single-ended drive scenario) or both arms of the MZI (e.g., in a differentially driven scenario) by changing dispersion properties of respective waveguides forming the arms of the MZI. The dispersion properties of the respective waveguides can be adjusted by applying heat to the respective waveguides (e.g., using a thermal phase electrode (TPE)) or by reverse biasing the MZI. However, using an MZ-VOA to attenuate an optical beam may result in excess optical loss as a result of the presence of couplers (e.g., at an input to the MZI) and combiners (e.g., at an output to the MZI). Additionally, MZIs may have relatively strong dependence on operating wavelength and chip temperature, which may result in optical loss and poorly calibrated performance. Additionally, physical asymmetries in arms of an MZI (e.g., as a result of fabrication tolerances) may result in further optical loss or poorly calibrated performance.

Another type of VOA that can be used is an electro-absorption (EA) VOA. An EA-VOA achieves a change in a refractive index (e.g., and a resulting attenuation) using an anisotropic electro-optical effect, which includes a linear electro-optic effect (e.g., the Pockels effect) and/or a non-linear electro-optic effect (e.g., the Kerr effect). The linear electro-optic effect occurs at relatively low magnitudes of applied electric field and in crystal structures without inversion symmetry. Accordingly, EA-VOAs are limited in waveguide material selection and orientation as well as in applied electric field strength. The non-linear electro-optic effect has a strong non-linear dependency on the electric field, which can result in distortion of an output optical signal. Accordingly, a strong dependency on applied bias, a large power dissipation, and a large temperature and wavelength dependency in EA-VOAs may result in difficult to configure feedback control loops.

Accordingly, it is desirable to provide an integrated VOA, such as for 100 Gigabit (Gb) or higher C or L-band receiver chips. For example, it is desirable for a VOA to have relatively strong temperature and wavelength independence, thereby enabling stable control of the VOA. Additionally, or alternatively, it is desirable for a VOA to use a relatively small range of control signals (e.g., a range of, for example, 0 Volts (V) to 3 V) to control attenuation in the VOA with linear increases in control signal currents providing a linear increase in optical attenuation (e.g., rather than a raised cosine transfer function relationship between current and optical attenuation in MZIs). Additionally, or alternatively, it is desirable to have a driving current of a VOA be relatively small (e.g., less than 30 milli-amps (mA)) to avoid excess power consumption requirements.

Some implementations described herein provide an efficient VOA using a multi-mode interferometer (MMI) with carrier injection. For example, a VOA may use carrier injection to cause a refractive index change within an MMI waveguide, which causes a destruction of the self-imaging phenomena within the MMI waveguide. This results in a reduced optical power coupled to the output waveguide. By controlling the refractive index change in the multimode waveguide, the degradation in the self-imaging phenomena can be controlled to achieve a desired optical attenuation of the optical beam in an output waveguide. Based on using carrier injection to cause the refractive index change in the MMI waveguide, the VOA achieves efficient attenuation over a wide range of optical wavelengths and chip temperatures, and achieves stable operation using a relatively small range of control signals and a relatively small driving current.

Figure 1B:
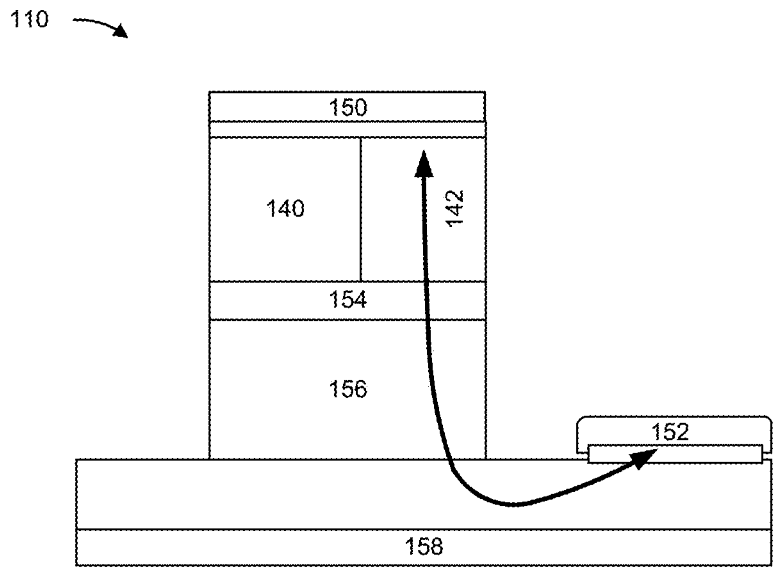
Figure 1C:
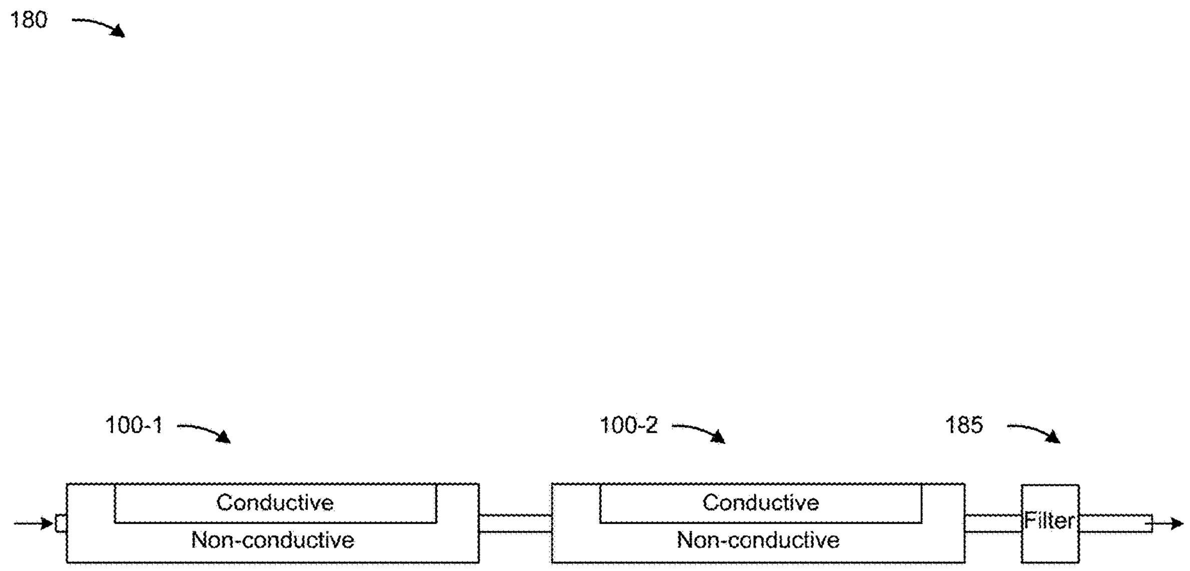

FIGS. 1A-1C are diagrams of an example electro-optical device 100 associated with top view (1A/1C) and cross-section (1B) of an integrated MMI VOA. As shown in FIGS. 1A-1C, the electro-optical device 100 includes an MMI waveguide 110, an input waveguide 120, and an output waveguide 130. In this case, the MMI 110 forms a 1×1 MMI VOA.

As further shown in FIG. 1A, and under no electrical control, the MMI waveguide 110 couples the input waveguide 120 to the output waveguide 130. For example, the input 120 may receive an input optical beam, which may propagate through the MMI waveguide 110 and self-image resulting in the same shape of the input optical beam at the output waveguide 130. In this case, the output 130 may provide an output optical beam similar to the input one with almost the same power, as described in more detail with respect to in FIG. 2A, without any attenuation.

The self-imaging is a property of electromagnetic field propagation in a multimode waveguide that has a constant lateral refractive index along the propagation direction, such as the MMI 110 of the MMI VOA. In self-imaging, the input optical beam replicates laterally at certain positions along the propagation direction. This replication may be single image, double image, triple image, or even more images depending on the design parameters of the MMI waveguide and optical signal wavelength. For example, as described in more detail with respect to FIG. 2A, in one example of self-imaging 1, 2, and 3 lateral replicas can be self-imaged along propagation. The output waveguide 130 can be located at a propagation distance where there is only one image resulting in 1×1 MMI for an MMI VOA. Alternatively, if 2 output waveguides are located at the lateral positions of the 2 images, a 1×2 MMI can be achieved and used as a splitter or coupler with an input field (e.g., the input optical beam) being split 50:50 between the two outputs.

In some implementations, the MMI waveguide 110 may be coupled to a control component (not shown). For example, the MMI waveguide 110 may be associated with a bias source (e.g., an electrode or a set of electrodes) and a controller associated with controlling the bias source. In this case, the controller may generate and provide a control signal to cause the bias source to apply a biasing voltage, which controls attenuation of the MMI waveguide 110. As described in more detail below, applying the biasing voltage injects current into some regions of the MMI waveguide 110, which causes an asymmetrical change to the refractive index of the multimode MMI waveguide 110. Based on the asymmetrical change in the refractive index of the MMI waveguide 110, the self-imaging phenomena of the MMI waveguide 110 is disturbed resulting in a degradation of the power coupled to each image along propagation, and thus an attenuation in the optical power of the single image of the 1×1 MMI, as described in more detail below.

In some implementations, the MMI waveguide 110 may include a first section and a second section. For example, as shown in FIG. 1A, in a top-down view, the MMI waveguide 110 may include a non-conductive region 140 and a conductive region 142. Similarly, as shown in FIG. 1B, in a cross-section view, the MMI waveguide 110 may include a p-metal region 150, an n-metal region 152, an optical core 154, an n-doped undercladding 156, and a substrate 158. For example, the p-metal region 150 may be paired with the n-metal region 152 to provide current injection through the conductive region 142 and the optical core 154 (as well as the n-doped undercladding 156). In this case, one or more parameters of the MMI waveguide 110 are associated with a refractive index of the optical core 154. For example, a geometrical parameter, such as a geometry of the non-conductive region 140 and the conductive region 142, may affect the refractive index of the optical core 154. Additionally, or alternatively, a material parameter, such as a material selection for the non-conductive region 140 and the conductive region 142, may affect the refractive index of the optical core 154. For example, the optical core 154 may be a bulk semiconductor material forming an epitaxial structure. In some implementations, the non-conductive region 140 may include an implanted region that is ion implanted to affect a passage of current through the non-conductive region 140. In some implementations, the non-conductive region 140 is an insulating region. For example, the non-conductive region 140 may be less conductive than the conductive region 142.

In some implementations, the p-metal region 150 and the n-metal region 152 are a pair of ohmic contacts (e.g., aligned at a top and a bottom of an MMI) that cause a forward voltage to be applied across the MMI and cause a current to pass through the MMI. In some implementations, the pair of ohmic contacts cover only a portion of the MMI (e.g., less than an entirety of the optical core 154). In this case, as the current passes through the MMI (e.g., the optical core 154), carriers (e.g., electrons and holes) flow through the MMI and interact with an electromagnetic field propagating therethrough. The carriers cause a perturbation to a refractive index of the optical core 154 by changing absorption properties of the optical core 154. The change to the absorption properties and associated refractive index may be a result of a free carrier absorption (FCA) effect, a bandgap shrinkage effect, and/or a bandfilling effect. Based on changing the refractive index, a propagation of the electromagnetic field through the optical core 154 is perturbed, resulting in a change to the output optical beam relative to the input optical beam. For example, the output optical beam may be attenuated, split (into multiple beams), or combined (with another beam) relative to the input optical beam.

In some implementations, the p-metal region 150 and the n-metal region 152 may apply a forward voltage through only a portion of the optical core 154. For example, a geometry of the non-conductive region 140, and/or a position of the p-metal region 150 and the n-metal region 152 along a length of the MMI waveguide 110, may result in some portions of the optical core 154 being subject to different forward voltages than other portions (or a lack of forward voltage entirely). In this way, the refractive index of the optical core 154 can be selectively perturbed to control the attenuation (or other effect) on the optical beam passing through the MMI waveguide 110. In some implementations, geometric parameters (e.g., of the p-metal region 150, the n-metal region 152, or the non-conductive region 140, among other examples) may be controlled using an etching process, a cladding process, a masking process, or another type of layer formation or manufacturing process.

As shown in FIG. 1C, an example optical system 180 may include at least one electro-optical device 100. For example, the optical system 180 may include a first electro-optical device 100-1 and a second electro-optical device 100-2. In this case, the first electro-optical device 100-1 and the second electro-optical device 100-2 form a set of cascaded 1×1 MMI VOAs with a 1×1 modal filter 185 connected to the second electro-optical device 100-2. In some implementations, the first electro-optical device 100-1 and the second electro-optical device 100-2 are connected in series. In some implementation, current injection into the first electro-optical device 100-1 is the same as current injection into the second electro-optical device 100-2. Additionally, or alternatively, current injection into the electro-optical devices 100 may be different to achieve, for example, differing levels of attenuation in each electro-optical device 100 or another adjustment to a characteristic of the electro-optical devices 100.

By injecting current into multiple electro-optical devices 100 connected in series, the optical system 180 may achieve a higher level of attenuation relative to driving a single MMI VOA with the same total current. For example, the optical system 180 may achieve a higher level of attenuation (e.g., approximately twice the attenuation) at, for example, 10 mA, than is achieved by a single electro-optical device 100 driven with the same 10 mA. This may occur as a result of an attenuation slope of an electro-optical device 100 being greatest at lower currents. The filter 185 may be included in the optical system 180 to filter out higher order modes, which may be created by the disturbed self-imaging of an optical beam within each electro-optical device 100 that results from the current injection. For example, the filter 185 may be a passive 1×1 MMI (e.g., the first and second electro-optical devices 100 may be active MMIs) that is configured to filter higher order modes (e.g., modes higher than a first fundamental mode). In this way, the filter 185 ensures that only a fundamental mode is coupled into an output single mode waveguide of the optical system 180. Additionally, or alternatively, the filter 185 may improve attenuation efficiency.

As indicated above, FIGS. 1A-1C are provided as an example. Other examples may differ from what is described with regard to FIGS. 1A-1C. The number and arrangement of devices shown in FIGS. 1A-1C are provided as an example.

Figure 2A:
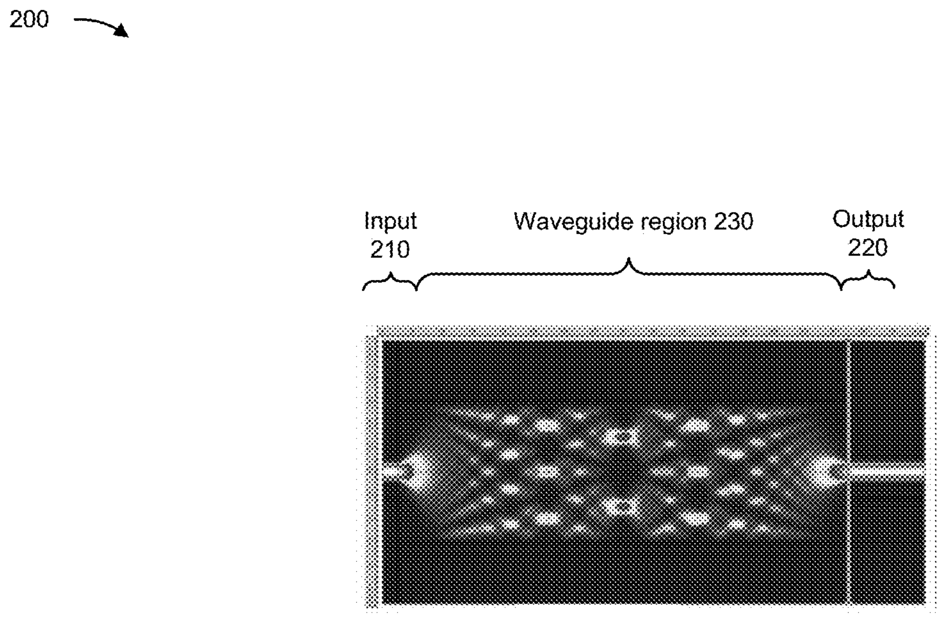
FIGS. 2A-2C are diagrams of an example associated with self-imaging in an integrated multi-mode interferometer (MMI) VOA at different forward bias conditions.
Figure 2B:
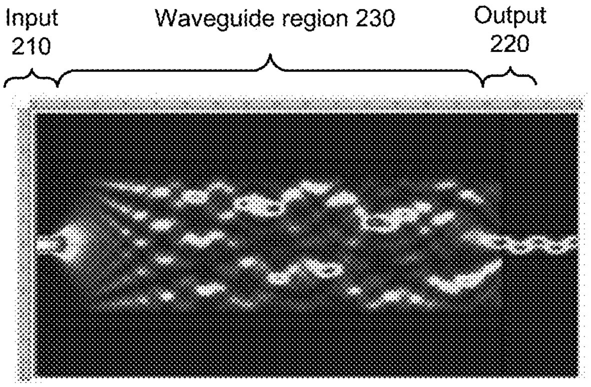
Figure 2C:
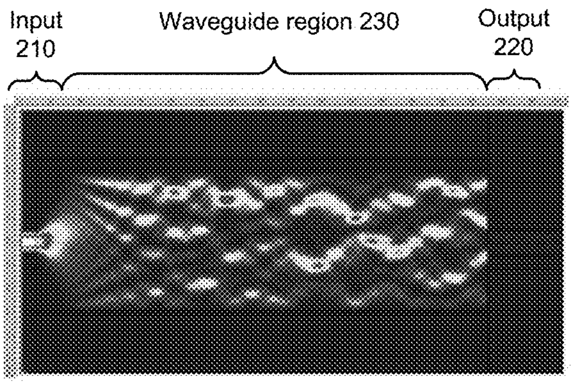

FIGS. 2A-2C are diagrams of an example 200 associated with self-imaging in an integrated MMI VOA. For example, FIGS. 2A-2C show an example of self-imaging in a 1×1 MMI with increasing electrical current control signals. As shown in FIG. 2A, in an unperturbed state (e.g., with 0 milli-amps (mA) current injection), the unperturbed refractive index within the 1×1 MMI results in proper self-imaging of an optical beam from an input 210 to an output 220 via the multimode waveguide 230. In this case, there is no attenuation of the optical beam. In FIG. 2B, with some amount of current injection, (such as 5 mA) the altered refractive index in the active part of the 1×1 MMI (corresponding to conductive region 142 in MMI waveguide 110) perturbs the self-imaging of the optical beam within the waveguide 230. This results in characteristics, such as a shape, a location, or a power of the image of the optical beam at the end of the waveguide region 230, among other examples to not properly match the output waveguide 220, which consequently results in an attenuated optical beam coupled to 220. Similarly, in FIG. 2C, with higher amount of current injection, (such as 20 mA) a further altered refractive index in the active region of the 1×1 MMI results in higher disruption of the self-imaging phenomena of the optical beam within the waveguide 230, and thus further reduction of the amount of power coupled to the output waveguide 220, and thus higher attenuation.

As indicated above, FIGS. 2A-2C are provided as an example. Other examples may differ from what is described with regard to FIGS. 2A-2C.

Figure 3:
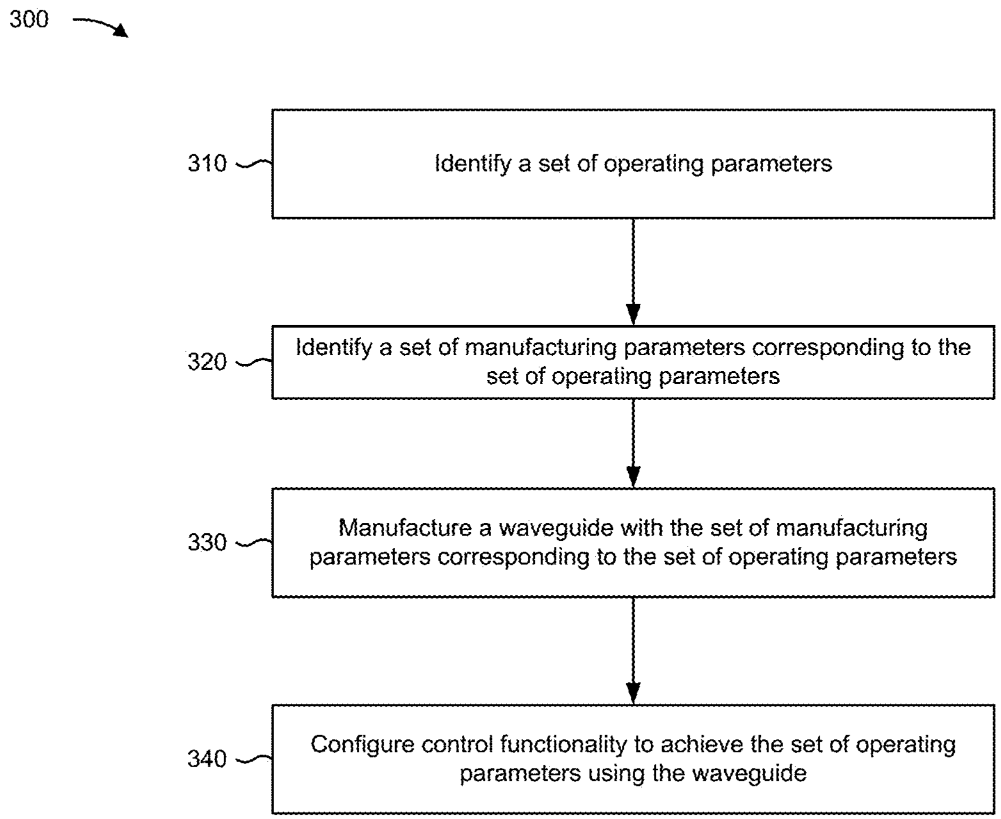
FIG. 3 is a flowchart of an example process associated with manufacturing an integrated VOA.

FIG. 3 is a flowchart of an example process 300 associated with manufacturing an integrated VOA. In some implementations, one or more process blocks of FIG. 3 are performed by a manufacturing device (e.g., a process control device, a controller, a server device, or a deposition device).

As shown in FIG. 3, process 300 may include identifying a set of operating parameters (block 310). For example, the manufacturing device may identify a range of operating wavelengths, a range of operating temperatures, a range of possible control signal current values, a range of possible voltages, or another operating parameter for an integrated VOA. In some implementations, the range of possible voltages may be a range of approximately 0 V to 3 V. In some implementations, the range of possible operating wavelengths may include the L-band. In some implementations, the range of possible control signal current values may be approximately 0 mA to 30 mA. In this case, the integrated VOA may be configured to have a total current driving the integrated VOA of less than a threshold current value. Satisfying one or more of the aforementioned ranges may enable use with, for example, 130G L-band receiver chips, which may be deployed in optical communications systems. Other ranges of parameters may enable use with other optical devices or optical systems.

As further shown in FIG. 3, process 300 may include identifying a set of manufacturing parameters corresponding to the set of operating parameters (block 320). For example, the manufacturing device may identify a geometric parameter (e.g., a geometry of a conductive region or a non-conductive region) or a material parameter (e.g., a material selected for a conductive region or a non-conductive region), among other examples. In some implementations, the manufacturing device may perform an optimization procedure to determine the set of manufacturing parameters. For example, the manufacturing device may generate a carrier distribution as a function of an injection current (e.g., using a simulation package), generate a corresponding refractive index change as a function of the injection current, and generate an interpolated look-up table mapping refractive index changes to arbitrary current amounts. In this case, the manufacturing device may generate a model of an integrated VOA using a set of dimensions for the VOA and use the look-up table to determine a refractive index profile for the VOA for a configured range of currents. Based on the model of the integrated VOA, the manufacturing device may simulate the VOA loss as a function of injection current and identify a set of optimized parameters for achieving a desired amount of attenuation loss across a range of possible injection currents.

As further shown in FIG. 3, process 300 may include manufacturing a waveguide with the set of manufacturing parameters corresponding to the set of operating parameters (block 330). For example, the manufacturing device may deposit a set of layers of material to form a waveguide with a particular material profile or set of geometric parameters.

As further shown in FIG. 3, process 300 may include configuring control functionality to achieve the set of operating parameters using the waveguide (block 340). For example, the manufacturing device may provide a control component (e.g., a controller that controls voltage and current injection) with information identifying control signals to achieve a desired level of current injection, associated refractive index change, and associated attenuation.

Process 300 may include additional implementations, such as any single implementation or any combination of implementations described herein.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

Figure 4A:
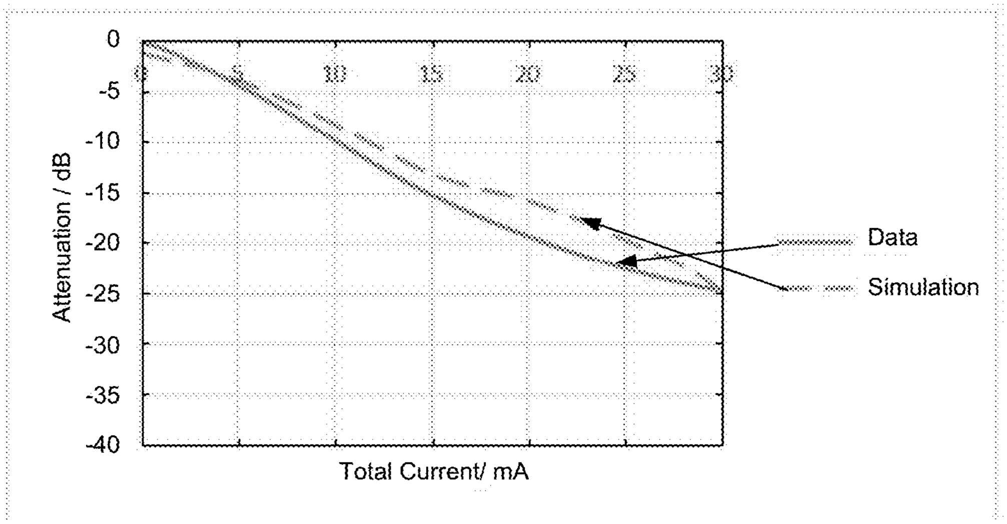
FIGS. 4A and 4B are diagrams of examples associated with an integrated MMI VOA.
Figure 4B:
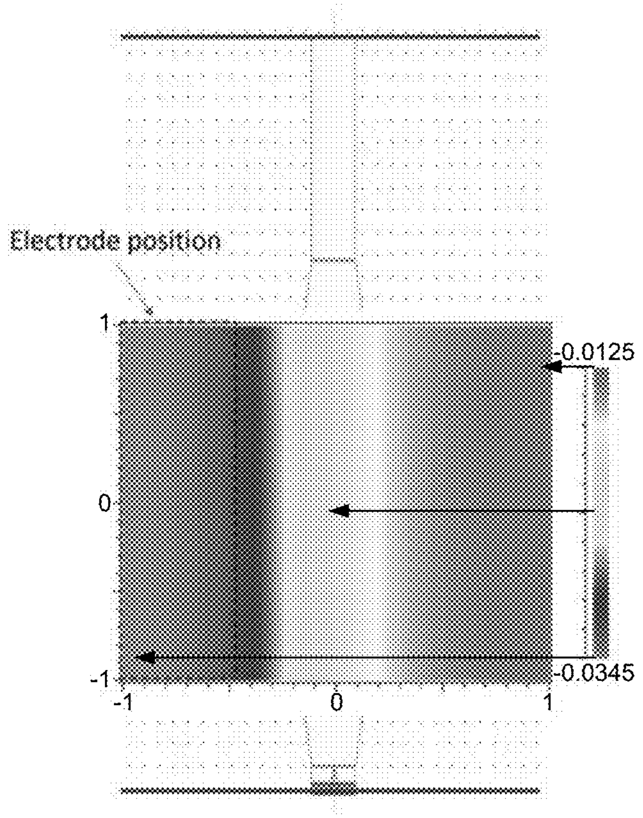

FIGS. 4A and 4B are diagrams of an example 400/410 associated with an integrated VOA. FIG. 4A shows a comparison between a simulated and observed attenuation relative to total input current using an integrated VOA that is configured as a 1×1 MMI VOA. As shown, for current values ranging from 0 mA to 30 mA, an observed integrated VOA, as described herein, may achieve attenuation amounts of between 0 decibels (dB) and −25 dB. Further, a deviation between a simulated attenuation and an observed attenuation does not exceed 5 dB in the range of input currents between 0 mA and 30 mA. Accordingly, use of an integrated VOA, as described herein, achieves a relatively high level of stability relative to a theoretical configuration of such a VOA. Additionally, or alternatively, use of, for example, a closed loop feedback controller for the integrated VOA can compensate for deviations between a theoretical configuration and observed performance of an integrated VOA.

FIG. 4B shows an example 410 of a refractive index profile perturbation for a core of an MMI (e.g., an optical core of a waveguide of a 1×1 MMI VOA, as described herein). As shown in FIG. 4B, at different lateral position of the 1×1 MMI VOA the refractive index changes may vary in a range of −0.0125 and −0.0345 relative to a nominal value at an operating wavelength of 1600 nm. Different electrode position, width, and length may result in different refractive index value variation with current injection.

As indicated above, FIGS. 4A and 4B are provided as an example. Other examples may differ from what is described with regard to FIGS. 4A and 4B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When a component or one or more components (e.g., an MMI or one or more MMIs) is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A variable optical attenuator (VOA), comprising:
a multi-mode interferometer (MMI), comprising:
an optical waveguide,
wherein a set of parameters of the optical waveguide is configured to cause a set of modes of an optical beam to interfere and self-image the optical beam; and
a control component to apply a forward voltage across the VOA to control attenuation of the VOA,
wherein a change in a part of a refractive index of the optical waveguide is associated with carrier injection associated with the forward voltage,
wherein the VOA includes a conductive region and a non-conductive region, and
wherein the non-conductive region is configured to cause one or more first portions of the VOA to be associated with different forward voltages compared to one or more second portions of the VOA, based on a geometry of the non-conductive region.

2. The VOA of claim 1, wherein the MMI is a 1×1 MMI.

3. The VOA of claim 1, wherein the optical waveguide is configured to support three or more electromagnetic field modes.

4. The VOA of claim 1, further comprising:
a set of ohmic contacts aligned to the MMI to apply the forward voltage across a portion of the MMI, the portion of the MMI being less than an entirety of the MMI.

5. The VOA of claim 4, wherein the MMI includes an insulating region associated with the non-conductive region, and wherein the conductive region is associated with the portion of the MMI across which the forward voltage is applied.

6. The VOA of claim 1, wherein the set of parameters includes at least one of a set of geometric parameters or a set of material parameters.

7. The VOA of claim 1, wherein the MMI is a first VOA MMI, and further comprising:
a second VOA MMI connected in series with the first MMI such that a current is injected equally or differentially in the first MMI and the second MMI in connection with the forward voltage.

8. The VOA of claim 1, wherein the MMI is an active MMI, and further comprising:
a passive MMI aligned to an output of the active MMI, the passive MMI being configured to filter higher order modes and pass through a fundamental mode.

9. An electro-optical device, comprising:
at least one multi-mode interferometer (MMI) variable optical attenuator (VOA),
an MMI VOA, of the at least one MMI VOA, comprising:
an input to receive an optical beam;
an output to output the optical beam; and
a multi-mode waveguide to couple the input to the output,
wherein a set of parameters of the multi-mode waveguide are associated with self-imaging the optical beam within the multi-mode waveguide, the set of parameters including at least one of a set of geometric parameters and/or a set of material parameters; and
a control component to apply a forward voltage across the MMI VOA to control attenuation of the MMI VOA,
wherein the forward voltage causes a current to pass through the MMI,
wherein a change in a real and/or imaginary part of a refractive index of the multi-mode waveguide is associated with carrier injection associated with the current,
wherein the electro-optical device includes a conductive region and a non-conductive region, and
wherein the non-conductive region is configured to cause one or more first portions of the electro-optical device to be associated with different forward voltages compared to one or more second portions of the electro-optical device, based on a geometry of the non-conductive region.

10. The electro-optical device of claim 9, wherein the at least one MMI VOA forms at least one of: a splitter, a coupler, or a filter.

11. The electro-optical device of claim 9, further comprising:
a modal filter aligned to the output of the at least one MMI VOA.

12. The electro-optical device of claim 9, the control component is configured to perturb a refractive index of a core of the at least one MMI VOA by at least a threshold percentage.

13. The electro-optical device of claim 9, wherein an epitaxial structure of the multi-mode waveguide includes a bulk semiconductor material.

14. The electro-optical device of claim 9, wherein carrier injection in the multi-mode waveguide is associated with at least one of: a free carrier absorption effect, a bandgap shrinkage effect, or a bandfilling effect.

15. An electro-optical device, comprising:
a multi-mode interferometer (MMI) variable optical attenuator (VOA), comprising:
an input to receive an optical beam;
an output to output the optical beam; and
a waveguide to couple the input to the output,
wherein the waveguide is configured to self-imaging the optical beam within the waveguide; and
a control component to apply a forward voltage across the MMI VOA to control attenuation of the MMI VOA,
wherein the electro-optical device includes a conductive region and a non-conductive region, and
wherein the non-conductive region is configured to cause one or more first portions of the electro-optical device to be associated with different forward voltages compared to one or more second portions of the electro-optical device, based on a geometry of the non-conductive region.

16. The electro-optical device of claim 15, wherein a refractive index of the waveguide is associated with the forward voltage applied across the MMI VOA.

17. The electro-optical device of claim 15, further comprising:
a set of insulating regions, associated with the non-conductive region and aligned to the waveguide, wherein a refractive index of the waveguide is associated with the set of insulating regions aligned to the waveguide.

18. The electro-optical device of claim 15, wherein the waveguide is an MMI waveguide.

19. The electro-optical device of claim 15, further comprising:

a set of ohmic contacts connected to the control component to apply the forward voltage.

20. The VOA of claim 1, further comprising:

a bias source configured to apply a biasing voltage and inject a current into regions of the optical waveguide, and create asymmetrical change to the refractive index of the optical waveguide.

* * * * *